(12) United States Patent
Wang et al.

(10) Patent No.: US 11,405,921 B2
(45) Date of Patent: Aug. 2, 2022

(54) COMMUNICATION METHOD, TERMINAL, AND BASE STATION

(71) Applicant: HUAWEI TECHNOLOGIES CO., LTD., Guangdong (CN)

(72) Inventors: Tingting Wang, Shenzhen (CN); Qufang Huang, Shanghai (CN); Xing Liu, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 16/713,426

(22) Filed: Dec. 13, 2019

(65) Prior Publication Data

US 2020/0120660 A1 Apr. 16, 2020

Related U.S. Application Data

(63) Continuation of application No. PCT/CN2018/091865, filed on Jun. 19, 2018.

(30) Foreign Application Priority Data

Jun. 16, 2017 (CN) .......................... 201710459584.2

(51) Int. Cl.
*H04W 72/04* (2009.01)
*H04W 72/02* (2009.01)

(52) U.S. Cl.
CPC ......... *H04W 72/048* (2013.01); *H04W 72/02* (2013.01); *H04W 72/0413* (2013.01); *H04W 72/0446* (2013.01)

(58) Field of Classification Search
CPC .................................................. H04W 72/02
See application file for complete search history.

(56) References Cited

U.S. PATENT DOCUMENTS 9,565,695 B2 2/2017 He et al.
9,723,596 B2 * 8/2017 Zhang ............... H04W 72/0413
(Continued)

FOREIGN PATENT DOCUMENTS

CN 102215595 A 10/2011
CN 103124207 A 5/2013
(Continued)

OTHER PUBLICATIONS

Intel Corporation , "DCI design considerations for NR", 3GPP TSG-RAN WG1 #89 Hangzhou, P.R. China, May 15-19, 2017, R1-1707384, total 5 pages.
(Continued)

*Primary Examiner* — Siming Liu

(57) ABSTRACT

Embodiments of this application provide a communication method, a terminal and a base station. The method includes: receiving, by a terminal, a scheduling request resource configuration sent by a base station, where the scheduling request resource configuration indicates an uplink resource type or logical channel information; and sending, by the terminal, a scheduling request to the base station via a target scheduling request resource based on the scheduling request resource configuration and uplink data, where the target scheduling request resource indicates a target uplink resource type, and the scheduling request resource configuration includes the target scheduling request resource. In the embodiments of this application, when diversity of the uplink data is considered, the base station configures different scheduling request resources for different service characteristics, and the terminal selects different scheduling request resources for different service characteristics, to improve effectiveness of uplink service transmission.

21 Claims, 5 Drawing Sheets

(56) References Cited

U.S. PATENT DOCUMENTS

| | | | | |
|---|---|---|---|---|
| 10,455,600 | B2* | 10/2019 | Lee | H04L 5/0053 |
| 2010/0077100 | A1* | 3/2010 | Hsu | H04W 8/24 |
| | | | | 709/234 |
| 2011/0261747 | A1* | 10/2011 | Wang | H04B 7/155 |
| | | | | 370/315 |
| 2012/0069805 | A1* | 3/2012 | Feuersanger | H04W 72/0413 |
| | | | | 370/329 |
| 2012/0100864 | A1* | 4/2012 | Susitaival | H04W 72/0446 |
| | | | | 455/450 |
| 2013/0016707 | A1 | 1/2013 | He et al. | |
| 2016/0021646 | A1* | 1/2016 | Hu | H04W 52/28 |
| | | | | 370/329 |
| 2016/0044707 | A1* | 2/2016 | Folke | H04W 28/0278 |
| | | | | 370/329 |
| 2016/0088624 | A1* | 3/2016 | Lee | H04W 52/365 |
| | | | | 370/329 |
| 2016/0219640 | A1* | 7/2016 | Jung | H04B 17/318 |
| 2017/0006650 | A1* | 1/2017 | Jung | H04W 72/0453 |
| 2017/0013610 | A1* | 1/2017 | Lee | H04L 1/1861 |
| 2017/0164363 | A1 | 6/2017 | Zhang et al. | |
| 2017/0311317 | A1* | 10/2017 | Dinan | H04W 72/0486 |
| 2018/0020365 | A1 | 1/2018 | Xiong et al. | |
| 2018/0077608 | A1* | 3/2018 | Jung | H04W 88/04 |
| 2018/0077719 | A1* | 3/2018 | Nory | H04L 5/0042 |
| 2018/0227938 | A1* | 8/2018 | Lee | H04L 5/0053 |
| 2018/0255499 | A1* | 9/2018 | Loehr | H04W 40/22 |

FOREIGN PATENT DOCUMENTS

| | | |
|---|---|---|
| CN | 103906176 A | 7/2014 |
| CN | 104468030 A | 3/2015 |
| KR | 20080011198 A | 1/2008 |
| WO | 2016/153548 A1 | 9/2016 |
| WO | 2018225996 A1 | 12/2018 |

OTHER PUBLICATIONS

Office Action issued in EP Application No. 18817261.3 dated Dec. 23, 2020, total 9 pages.
Qualcomm Incorporated, Enhanced SR and BSR. 3GPP TSG-RAN WG2 Meeting #97bis, Spoken, USA, Apr. 3-7, 2017, R2-1703671, 4 pages.
Notice of Allowance issued in KR Application No. 9-5-2021-042397318, dated May 27, 2021, 2 pages.
International Search Report for PCT/CN2018/091865 dated Aug. 29, 2018, 4 pages.
Huawei et al.,"BSR enhancements with multiple numerologies", 3GPP TSG-RAN WG2 #98 R2-1705626, Hangzhou, China, May 15-19, 2017, total 3 pages.
Notice of Preliminary Rejection (Office Action) dated Nov. 23, 2020, issued in KR Application No. 10-2020-7001505 with English translation, total 8 pages.
3GPP TS 38.331 V0.0.4 (Jun. 2017), 3rd Generation Partnership Project;Technical Specification Group Radio Access Network; NR; Radio Resource Control (RRC); Protocol specification (Release 15 ), dated Jun. 16, 2016, total 22 pages.
3GPP TS 38.321 V0.0.4 (Jun. 2017), 3rd Generation Partnership Project;Technical Specification Group Radio Access Network; NR; Medium Access Control (MAC) protocol specification (Release 15), dated Jun. 16, 2016, total 31 pages.
R2-1702667 Ericsson (Rapporteur),"E-mail discussion report [97#62] SR/BSR Enhancements", 3GPP TSG-RAN WG2 #97bis, Spokane, USA, Apr. 3-7, 2017, total 13 pages.
Huawei et al: "SR enhancements with multiple numerologies", 3GPP Draft; R2-1705625, May 6, 2017 (May 6, 2017), XP051264924, total 4 pages.
Mediatek Inc: "SR/BSR design for multiple numerology", 3GPP Draft; R2-1704946, May 6, 2017 (May 6, 2017), XP051264651, total 3 pages.
Qualcomm Incorporated: "Enhanced SR and BSR", 3GPP Draft; V07 Final R2-170XXXX Enhanced SR and BSR, Apr. 3, 2017 (Apr. 3, 2017), XP051245574, total 4 pages.
Catt: "BSR enhancement", 3GPP Draft; R2-1704257, May 6, 2017 (May 6, 2017), XP051264345, total 4 pages.
Examination Report issued in Indian Application No. 201937054492, dated Mar. 10, 2021 total 6 pages.

* cited by examiner

COMMUNICATION METHOD, TERMINAL, AND BASE STATION

CROSS-REFERENCE TO RELATED APPLICATIONS

This application is a continuation of International Application No. PCT/CN2018/091865, filed on Jun. 19, 2018, which claims priority to Chinese Patent Application No. 201710459584.2, filed on Jun. 16, 2017. The disclosures of the aforementioned applications are hereby incorporated by reference in their entireties.

TECHNICAL FIELD

The present application relates to the field of wireless communications technologies, and in particular, to a communication method, a terminal, and a base station.

BACKGROUND

With the development of wireless communications technologies, and the popularization and diversity of terminals, various terminals can support a plurality of types of services.

In the prior art, a terminal requests an uplink resource from a base station in advance, and transmits an uplink service to the base station based on the uplink resource scheduled by the base station. However, the foregoing service scheduling manner is excessively undiversified, and effectiveness of the terminal on transmission of different services cannot be improved.

SUMMARY

Example embodiments of this application provide a communication method, a terminal, and a base station, to effectively improve uplink transmission mechanisms for different services.

According to an aspect, an embodiment of this application provides a communication method. The method includes: sending, by a base station, a scheduling request resource configuration to a terminal. When the scheduling request resource configuration indicates an uplink resource type, the uplink resource type includes a target uplink resource type. When the scheduling request resource configuration indicates logical channel information, the logical channel information includes target logical channel information, and the target logical information corresponds to the target uplink resource type. When the diversity of uplink data is considered, the base station may configure different scheduling request resources for different services, or the terminal may select different scheduling request resources for different services, to improve effectiveness of uplink service transmission.

In a possible implementation, the terminal sends a scheduling request to the base station on a target scheduling request resource, and the scheduling request resource configuration includes the target scheduling request resource. The terminal determines the target uplink resource type based a logical channel or a logical channel group, and selects the corresponding target scheduling request resource based on the target uplink resource type. The embodiment simplifies configuration of a scheduling request resource by the base station, and increases flexibility of applying the scheduling request resource by the terminal. In a possible implementation, the terminal sends a scheduling request to the base station on a target scheduling request resource, and the scheduling request resource configuration includes the target scheduling request resource. The base station selects, based on a logical channel or a logical channel group, the target uplink resource type from at least one uplink resource type corresponding to the logical channel or the logical channel group, and configures the target scheduling request resource based on the target uplink resource type. The embodiment simplifies selection of a scheduling request resource by the terminal, and increases flexibility of configuring the scheduling request resource by the base station.

In a possible implementation, the scheduling request resource or the scheduling request resource configuration indicates only one uplink resource type or indicates more than one uplink resource type. The scheduling request resource may be configured based on the uplink resource type. The uplink resource type includes at least one of the following: a subcarrier spacing, a cyclic prefix length, a transmission time interval (TTI) length, and uplink transmission power. The terminal determines, based on the uplink data, a proper uplink resource type for sending the uplink data, to select a scheduling request resource corresponding to the uplink resource type. In the implementation, the terminal may determine the proper uplink resource type based on a logical channel or a logical channel group carrying the uplink data, and select the corresponding scheduling request resource, to simplify the configuration of the scheduling request resource by the base station, and increase the flexibility of applying the scheduling request resource by the terminal.

In a possible implementation, the scheduling request resource or the scheduling request resource configuration indicates at least one logical channel or logical channel group. The scheduling request resource may be configured based on the logical channel or the logical channel group. The base station determines, based on at least one uplink resource type corresponding to the logical channel or the logical channel group, the target uplink resource type used by the terminal to transmit uplink data carried on the logical channel or the logical channel group, and configures the target scheduling request resource used by the terminal to send the scheduling request. The implementation simplifies the selection of the scheduling request resource by the terminal, and increases the flexibility of configuring the scheduling request resource by the base station.

In a possible implementation, the terminal selects the target scheduling request resource based on a priority sequence of one or more logical channels/logical channel groups or based on a priority sequence of one or more uplink resource types corresponding to one or more logical channels/logical channel groups. The priority sequence of the logical channels/the logical channel groups is determined based on any one or more of the following cases: strictness of the uplink data on a latency requirement, a data volume of the uplink data, a waiting time period of the uplink data in a buffer, or a type of the uplink data. In the implementation, the terminal may request, from the base station based on the type or a characteristic of the to-be-transmitted uplink data, an uplink resource for sending the scheduling request, to improve transmission flexibility and effectiveness of different services.

In a possible implementation, the scheduling request resource configuration includes a mapping relationship between the uplink resource type and the scheduling request resource or a mapping relationship between the logical channel information and the scheduling request resource. Further, the scheduling request resource configuration includes a mapping relationship between the scheduling request resource and a logical channel or a logical channel group that is indicated by the logical channel information, so that the terminal can learn of, in time based on the configuration, the uplink resource type, the logical channel, or the logical channel group that corresponds to the scheduling request resource in the configuration, thereby simplifying configuration of the terminal, and improving time validity.

In a possible implementation, the scheduling request resource includes first time information used to instruct the terminal to stop sending the scheduling request in a first time period, and the first time information is determined based on the uplink resource type or the logical channel information. A time length of sending the scheduling request by the terminal is limited, so that an unnecessary waste of an air interface resource can be reduced, and effectiveness of uplink scheduling can be improved.

In a possible implementation, the scheduling request resource includes second time information used to indicate a second time interval at which the terminal sends the scheduling request. The implementation can prevent the terminal from frequently triggering a resource request process due to a logical channel or logical channel group having a low priority.

Another aspect of this application provides a buffer status report (BSR), the BSR includes buffer information, and the buffer information includes a data volume (which is referred to as a data buffer size below) of uplink data carried on one or more logical channels or one or more logical channel groups.

In a possible implementation, the BSR further includes logical channel information, and the logical channel information includes a logical channel identifier or a logical channel group identifier.

In a possible implementation, the BSR further includes bitmap information of the logical channels. The bitmap information indicates whether the BSR includes the data volumes of the uplink data on the logical channels or the logical channel groups.

In any possible implementation of the BSR, a terminal may autonomously determine content, a format, or a size of the BSR based on a service type or characteristic, to improve effectiveness of uplink service transmission, and improve flexibility of the terminal.

In a possible implementation, the data buffer size is not zero. A quantity of buffers that is indicated by the BSR is reduced, to reduce air interface load, and improve a throughput.

In a possible implementation, the data buffer size is greater than a threshold. A data volume that is of uplink data on any logical channel or logical channel group and that is carried in the BSR is greater than the threshold. A quantity of buffers that is reported by using the BSR is reduced, to reduce air interface load, and improve a throughput.

In a possible implementation, a quantity of one or more logical channels or one or more logical channel groups on which uplink data corresponding to the data buffer size is located is not greater than a preset value. A quantity of buffers that is reported by using the BSR is reduced, to reduce air interface load, and improve a throughput.

In a possible implementation, some or all of uplink data corresponding to the data buffer size is transmitted by the terminal to the base station in a waiting time period. The waiting time period is determined based on duration of a discard timer of the terminal. When a time segment between a buffer time of uplink data on a logical channel or a logical channel group and an expiration time of the discard timer is less than a particular time segment, the terminal adds a data volume of the uplink data on the logical channel or the logical channel group to the BSR or reports a data volume of the uplink data on the logical channel or the logical channel group. When a time segment between a buffer time of uplink data on a logical channel or a logical channel group and an expiration time of the discard timer is greater than the particular time segment, the terminal does not add a data volume of the uplink data on the logical channel or the logical channel group to the BSR or does not report a data volume of the uplink data on the logical channel or the logical channel group. When the discard timer expires, the terminal discards the uplink data. Whether to add the data volume of the uplink data to the BSR is determined based on the waiting time period, so that a latency of sending the uplink data by the terminal can be reduced, and quality of service of a radio bearer can be satisfied.

In a possible implementation, some or all of the uplink data corresponding to the data buffer size is reported by the terminal to the base station for the first time. When the uplink data reported first time exists on a logical channel or a logical channel group, the terminal may send a data volume of all uplink data on the logical channel or the logical channel group to the base station, may send a data volume of only the data reported first time on the logical channel or the logical channel group, or may not send a data volume of uplink data on the logical channel or the logical channel group other than the data reported first time.

According to another aspect, an embodiment of the present application provides a network side device. The network side device may be a base station, or may be a control node.

According to another aspect, an embodiment of the present application provides a base station. The base station has a function of implementing behavior of a base station in the foregoing method implementations. The function may be implemented by hardware, or may be implemented by hardware executing corresponding software. The hardware or software includes one or more modules corresponding to the foregoing function.

In a possible implementation, a structure of the base station includes a processor and a transceiver, and the processor is configured to support the base station in performing corresponding functions in the foregoing method. The transceiver is configured to support communication between the base station and a terminal, and send information or an instruction that is used in the foregoing method to the terminal, or receive information or an instruction that is sent by the terminal. The base station may further include a memory, and the memory is configured to couple to the processor and store a program instruction and data that are necessary for the base station.

According to still another aspect, an embodiment of the present application provides a terminal. The terminal has a function of performing behavior of a terminal in the foregoing method implementations. The processor is configured to support the terminal in performing corresponding functions in the foregoing method. The transceiver is configured to support communication between a base station and the terminal, and send information or an instruction that is used in the foregoing method to the base station, or receive information or an instruction that is sent by the base station. The function may be implemented by software or hardware. A structure of the terminal includes the transceiver and the processor. The function may alternatively be implemented by hardware executing corresponding software. The hardware or software includes one or more modules corresponding to the foregoing function. The module may be software and/or hardware.

According to still another aspect, an embodiment of the present application provides a communications system. The system includes the base station and the terminal according to the foregoing aspects.

According to still another aspect of this application, a computer-readable storage medium is provided. The computer-readable storage medium stores an instruction. When the instruction is run on a computer, the computer is enabled to perform the method according to the foregoing aspects.

According to yet another aspect of this application, a computer program product including an instruction is provided. When the computer program product is run on a computer, the computer is enabled to perform the method according to the foregoing aspects.

BRIEF DESCRIPTION OF DRAWINGS

The following detailed description of exemplary non-limiting illustrative embodiments is to be read in conjunction with the drawings of which.

DESCRIPTION OF EMBODIMENTS

The following clearly describes the technical solutions in the embodiments of the present application with reference to the accompanying drawings in the embodiments of the present application.

Figure 1:
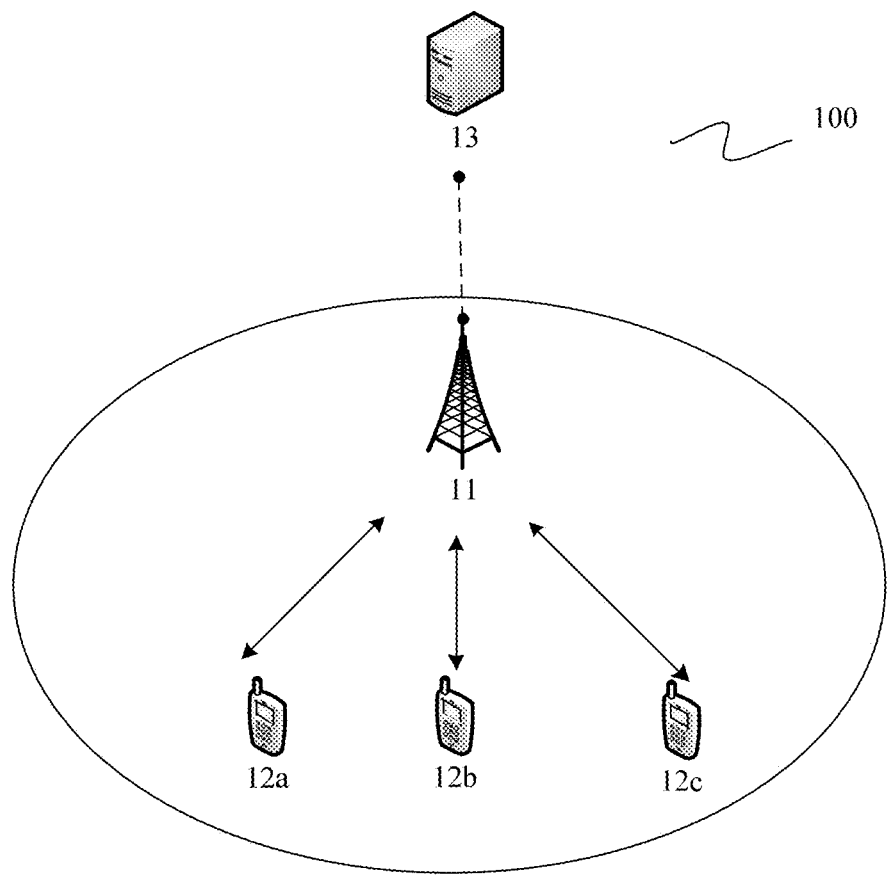
FIG. 1 is a schematic diagram of a communications system according to an embodiment of this application.

To resolve a problem in the prior art that uplink data transmission cannot be performed for different services in a communications system, the embodiments of the present application provide a technical solution based on a communications system shown in FIG. 1, to improve effectiveness of service transmission in the communications system. As shown in FIG. 1, an embodiment of this application provides a communications system 100. The communications system 100 at least includes one base station 11 and a plurality of terminals 12a, 12b, and 12c. For example, the base station 11 may cover the plurality of terminals 12a, 12b, and 12c, or serve the plurality of terminals 12a, 12b, and 12c. A system architecture and a service scenario that are described in the embodiments of the present application are intended to more clearly describe the technical solutions in the embodiments of the present application, and constitute no limitation on the technical solutions provided in the embodiments of the present application. A person of ordinary skill in the art may learn that as a network architecture evolves and a new service scenario emerges, the technical solutions provided in the embodiments of the present application are also applicable to a similar technical problem.

In the embodiments of the present application, the communications system 100 may be various radio access technology (RAT) systems, for example, code division multiple access (CDMA), time division multiple access (TDMA), frequency division multiple access (FDMA), orthogonal frequency division multiple access (OFDMA), single carrier frequency division multiple access (single carrier FDMA, SC-FDMA), long term evolution (LTE), and another LTE-based evolved system. For example, the communications system 100 may further be applicable to a future-proofed communications technology, for example, the 5$^{th}$ generation mobile communication (5G). The technical solutions provided in the embodiments of the present application are applicable to any communications system using a new communications technology.

In the embodiments of the present application, the base station 11 is an apparatus deployed in a radio access network to provide a wireless communication function for the terminal 12a, 12b, or 12c. The base station 11 may include various forms of macro base stations, micro base stations (also referred to as small cells or micro cells), relay nodes (RN), access points, and the like. In systems using different radio access technologies, names of devices having a function of the base station 11 may be different. For example, in the LTE system, the device is referred to as an evolved NodeB (eNB or eNodeB); in a 3rd generation (3G) system, the device is referred to as a NodeB; and so on. In the embodiments of the present application, any one of the following devices may be collectively referred to as a network side device: a base station, a control node connected to a base station, or any network side device that has a resource configuration, resource scheduling, or resource multiplex decision function. For ease of description, in all the embodiments of the present application, the foregoing apparatus providing the wireless communication function for the terminal or the network side device is collectively referred to as a base station or a BS.

In the embodiments of the present application, as shown in FIG. 1, the communications system 100 may further include a control node 13. The control node 13 may be connected to at least one base station, and schedule all resources in the system. For example, the control node 13 may configure a resource for the terminal to perform resource multiplex decision, interference coordination, or the like. For example, the base station 11 may be a NodeB in a UMTS system, and the control node 13 may be a network controller. For another example, the base station 11 may be a small cell, and the control node 13 may be a macro base station covering the small cell. For still another example, the control node 13 may be a cross-standard cooperative controller or the like in a wireless network, and the base station 11 is a base station in the wireless network. This is not limited in the embodiments of the present application.

The terminal (e.g., 12a, 12b, or 12c) in the embodiments of the present application may include various handheld devices, in-vehicle devices, wearable devices, and computing devices that have a wireless communication function, or another processing device connected to a wireless modem. The terminal may also be referred to as a mobile station (MS), user equipment (UE), and terminal equipment. The terminal may further include a subscriber unit, a cellular phone, a smartphone, a wireless data card, a personal digital assistant (PDA) computer, a tablet computer, the wireless modem, a handheld device, a laptop computer, a cordless phone, a wireless local loop (WLL) station, a machine type communication (MTC) terminal, a session initiation protocol (SIP) phone, the computing device having the wireless communication function, or the processing device, an in-vehicle device, a wearable device, or the like that is connected to the wireless modem. For ease of description, all the devices mentioned above are collectively referred to as the terminal in all the embodiments of the present application.

In the prior art, using the LTE system as an example, the base station allocates a scheduling request (SR) resource to the terminal. Therefore, the terminal can send an SR to the base station based on the SR resource. The SR is used by the terminal to request an uplink resource from the base station and send uplink data, for example, mobile broadband (MBB) service data, to the base station on the uplink resource allocated by the base station. The SR resource allocated by the base station to the terminal is not distinguished based on an uplink service of the terminal. To be specific, for all uplink services of the terminal, SR resources configured by the base station have a same format, causing a lack of diversity of uplink resources allocated by the base station to the terminal, and reducing effectiveness of sending the uplink service by the terminal.

In a 5G network, an ultra-reliable and low-latency communications (URLLC) technology is introduced. The URLLC technology has strict requirements on a data transmission latency and transmission reliability. For example, a latency of URLLC service data is less than 0.5 ms. Alternatively, a transmission success rate of URLLC service data is not less than 99.999%. The terminal may correspondingly have the foregoing plurality of uplink services. Therefore, types of uplink resources required by the terminal for sending different services to the base station also need to be diversified. In the embodiments of the present application, the uplink service, for example, an Internet of Things service, a voice service, an MBB service, or a URLLC service, may be understood as being carried in an uplink signal sent by the terminal to the base station. For ease of description, in all the embodiments of the present application, the uplink services mentioned above are collectively referred to as uplink data or data transmitted by the terminal to the base station. In addition, the uplink data may be understood as data having not been successfully transmitted by the terminal to the base station or to-be-transmitted data.

In an embodiment of the present application, a terminal receives a scheduling request resource configuration sent by a base station. The scheduling request resource configuration may indicate an uplink resource type or logical channel information. To be specific, the base station may configure a scheduling request resource for the terminal, so that the terminal sends a scheduling request to the base station. The scheduling request resource configuration such as an SR resource configuration may be used by the base station to allocate an uplink resource to the terminal. The uplink resource is used by the terminal to transmit uplink data to the base station. When the scheduling request resource configuration includes the scheduling request resource, the scheduling request resource may indicate the uplink resource type or the logical channel information. The indication may be a direct or an indirect indication, or an explicit or implicit indication. For example, the scheduling request resource may correspond to the uplink resource type. The scheduling request resource may further correspond to, based on a mapping relationship between the uplink resource type and the logical channel information, a logical channel or a logical channel group that is indicated by the logical channel information. When diversity of the uplink data is considered, the base station may configure different scheduling request resources for the terminal for different service characteristics, add the different scheduling request resources to the scheduling request resource configuration, and send the scheduling request resource configuration to the terminal. Further, the terminal may determine, based on the different service characteristics, the scheduling request resource used to transmit the scheduling request. For example, the scheduling request resource configuration may indicate, based on the uplink resource type or the logical channel information, an uplink resource corresponding to the scheduling request resource.

Using the uplink resource type as an example, the uplink resource type may include at least one of the following: a subcarrier spacing, a cyclic prefix length, a transmission time interval (TTI) length, and uplink transmission power. Each of the uplink resource types may be specific to an orthogonal frequency division multiplexing (OFDM) technology. For example, a subcarrier is a frequency domain resource for transmitting the uplink data. A smaller subcarrier spacing indicates a longer OFDM symbol period and higher system spectral efficiency. However, an excessively small subcarrier spacing is excessively sensitive to a Doppler frequency shift and phase noise, affecting system performance. Therefore, according to a selection principle of the subcarrier spacing, it may be considered that a subcarrier spacing that is as small as possible is used under a condition of maintaining a sufficient anti-frequency-offset capability. For another example, to avoid orthogonality destruction between subcarriers that is caused by multipath propagation, a cyclic prefix signal may be filled between OFDM symbols, to prevent communication interference. For a TTI, it may be understood that various services correspond to different TTIs because latency requirements of the services are different. The resource type may also be referred to as an air interface type, an air interface format, an air interface transmission mode, and the like, and is used by the terminal to transmit the corresponding uplink data to the base station. This is not limited in embodiments of the present application.

In this embodiment of the present application, the uplink data may be classified based on different types of services transmitted by the terminal, and correspond to different logical channels. Correspondingly, the logical channel information may be a logical channel (LCH) identifier or a logical channel group (LCG) identifier. A person skilled in the art may understand that, any identifier used to identify the logical channel or the logical channel group falls within the protection scope of the present application. The LCG may include at least one LCH. For example, four LCHs or eight LCHs may form one LCG. A difference is that data volumes of LCGs formed by different quantities of LCHs are different. Usually, different LCHs may correspond to a same uplink resource type or different uplink resource types. Different LCHs in one LCG may correspond to a same uplink resource type or different uplink resource types. One LCH may correspond to at least one uplink resource type. For another example, a priority sequence of different LCHs/LCGs may depend on characteristics of uplink data carried on the LCHs/LCGs. The priority sequence of the LCHs/LCGs may be understood as a sequence of sending uplink data to the base station by the terminal. For example, the priority sequence of the LCHs/LCGs may be determined based on any one or more of the following cases:

strictness of the uplink data on a latency requirement;
a data volume of the uplink data;
a waiting time period of the uplink data in a buffer; or a type of the uplink data.

In this embodiment of the present application, the scheduling request resource or the scheduling request resource configuration may indicate the uplink resource type in any one or more of the following manners. Using the scheduling request resource configuration as an example, descriptions are provided below:

Manner 1: The scheduling request resource configuration may indicate only one uplink resource type. For example, the scheduling request resource configuration may include time domain information and frequency domain information. The time domain information is used to indicate a location of the scheduling request resource in a frame structure (which may be at least one of a subframe location, a transmission period, or an offset). The frequency domain information is used to indicate a location of the scheduling request resource on a carrier (which may be a transport block or a transmission resource having similar performance). The base station may configure different scheduling request resources by using different combinations of the time domain information and the frequency domain information. The scheduling request resource may uniquely identify one uplink resource type. In addition, the scheduling request resource may alternatively be a physical uplink shared channel (PUSCH).

Specifically, the scheduling request resource may be configured based on the uplink resource type. The terminal determines, based on the uplink data, a proper uplink resource for sending the uplink data, to select a scheduling request resource corresponding to the uplink resource type. The scheduling request resource configuration may further include a value range of the uplink resource type. For example, when the value range is 0 to X, a value of X may be not less than a quantity of uplink resource types that can be supported by a 5G system. If a terminal can support a plurality of uplink resource types, the base station may independently configure a scheduling request resource for each uplink resource type. The base station may alternatively configure some parameters carried in the scheduling request resource configuration to be a same value, and configure remaining parameters to be different values, and different uplink resource types can be indicated similarly. This is not limited in embodiments of the present application.

Manner 2: The scheduling request resource configuration may indicate more than one uplink resource type. For example, the scheduling request resource configuration may include a mapping relationship between the uplink resource type and the scheduling request resource. Alternatively, the scheduling request resource configuration may further include an uplink resource type list in addition to time-frequency domain information or a PUSCH resource, to indicate a time-frequency domain resource or a PUSCH resource that is selected for an uplink resource type specifically corresponding to the scheduling request resource.

Usually, any uplink resource type corresponds to a different scheduling request resource, but the base station may alternatively configure a same scheduling request resource for a plurality of uplink resource types. For example, the base station configures time-frequency domain information or PUSCH resources carried on scheduling request resources corresponding to two uplink resource types to be a same value.

In this embodiment of the present application, the scheduling request resources in Manner 1 and Manner 2 directly define the uplink resource type. Therefore, this may be understood as indirect mapping. To be specific, the terminal may determine the proper uplink resource type based on an LCH or an LCG carrying the uplink data, and select the corresponding scheduling request resource. Configuration of the scheduling request resource by the base station is simplified through the indirect mapping, and flexibility of applying the scheduling request resource by the terminal is increased. For example, when a plurality of LCHs or LCGs all carry uplink data, the terminal may determine a priority of each LCH or LCG in the foregoing manner based on different service characteristics of the uplink data carried on the LCHs or LCGs. The terminal may select a target uplink resource type based on an LCH or an LCG having a highest priority, and obtain a target scheduling request resource corresponding to the target uplink resource type. For another example, when an LCH has a plurality of uplink resource types, the terminal may select a target uplink resource type based on a priority sequence of the uplink resource types, and obtain a target scheduling request resource corresponding to the target uplink resource type.

Manner 3: The scheduling request resource configuration may indicate only one LCH. For example, the scheduling request resource configuration may further include an LCH identifier in addition to time-frequency domain information or a PUSCH resource. The LCH identifier may be used to uniquely identify one LCH carrying the uplink data.

Specifically, the scheduling request resource may be configured based on the LCH. The base station determines, based on at least one uplink resource type corresponding to the LCH, a target uplink resource type used by the terminal to transmit uplink data carried on the LCH, and configures a corresponding parameter in the scheduling request resource configuration. For example, the parameter may be the time-frequency domain information or the PUSCH resource. Therefore, the terminal may send the scheduling request to the base station based on the target uplink resource type. For different LCHs, the base station may independently configure a scheduling request resource for each LCH. The base station may alternatively configure some parameters carried in the scheduling request resource configuration to be a same value, and configure remaining parameters to be different values, and different uplink resource types can be indicated similarly. This is not limited in embodiments of the present application.

Manner 4: The scheduling request resource configuration may indicate more than one LCH. For example, the scheduling request resource configuration may include a mapping relationship between the logical channel information and the scheduling request resource. Specifically, when the logical channel information is an LCH identifier, the scheduling request resource configuration may include a mapping relationship between the scheduling request resource and an LCH corresponding to the LCH identifier. When the logical channel information is an LCG identifier, the scheduling request resource configuration may include a mapping relationship between the scheduling request resource and an LCG corresponding to the LCG identifier. Alternatively, the scheduling request resource may further include an LCH list in addition to time-frequency domain information or a PUSCH resource, to indicate an LCH specifically corresponding to the scheduling request resource.

Usually, any LCH corresponds to a different scheduling request resource, but the base station may alternatively configure a same scheduling request resource for a plurality of LCHs. For example, the base station configures time-frequency domain information or PUSCH resources carried on scheduling request resources corresponding to two LCHs to be a same value.

Specifically, the base station may determine, based on a priority sequence of LCHs, a target uplink resource type used by the terminal to transmit uplink data carried on each of the LCHs, and configure a corresponding parameter in the scheduling request resource. For example, the parameter may be the time-frequency domain information or the PUSCH resource.

Manner 5: The scheduling request resource configuration may indicate only one LCG. For example, the scheduling request resource configuration may further include an LCG identifier in addition to time-frequency domain information or a PUSCH resource. The LCG identifier may be used to uniquely identify one LCG carrying the uplink data.

Specifically, the scheduling request resource may be configured based on the LCG. The base station determines, based on at least one uplink resource type corresponding to the LCG, a target uplink resource type used by the terminal to transmit the uplink data carried on the LCG, and configures a corresponding parameter in the scheduling request resource. For example, the parameter may be the time-frequency domain information or the PUSCH resource. Therefore, the terminal may send the scheduling request to the base station by using the target uplink resource type.

In this embodiment of the present application, the scheduling request resources in Manner 3 to Manner 5 directly define the logical channel information. Therefore, this may be understood as direct mapping. On one hand, the base station may select, based on the LCH or the LCG, a proper uplink resource type from the at least one uplink resource type corresponding to the LCH or the LCG, and configure the scheduling request resource. On the other hand, the terminal may directly select the corresponding scheduling request resource based on the logical channel information, to send the scheduling request to the base station. Selection of the scheduling request resource by the terminal is simplified through the direct mapping, and flexibility of configuring the scheduling request resource by the base station is increased. The base station finally determines the uplink resource type based on the LCH or the LCG, or based on a communication service of the base station or the terminal, communication quality, a quantity of terminals served by the base station, or the priority sequence of the LCHs or the LCGs. This is not limited in embodiments of the present application.

In this embodiment of the present application, the terminal sends the scheduling request to the base station on the scheduling request resource.

For example, the terminal may send the scheduling request to the base station on the target scheduling request resource based on the scheduling request resource configuration and the uplink data. Specifically, the terminal may determine the target uplink resource type based on the uplink data. Subsequently, the terminal may autonomously select, based on the target uplink resource type and from at least one scheduling request resource configured by the base station in Manner 1 or Manner 2, a target scheduling request resource indicating the target uplink resource type.

For another example, the terminal may send the scheduling request to the base station on the target scheduling request resource based on the scheduling request resource configuration. Specifically, the base station may configure at least one scheduling request resource based on the logical channel information in Manner 3, Manner 4, or Manner 5. The terminal determines, based on the logical channel information in the scheduling request resource, a logical channel having the uplink data and a target scheduling request resource corresponding to the logical channel. The target scheduling request resource indicates the target uplink resource type. Subsequently, the terminal sends the scheduling request to the base station on the target scheduling request resource.

In this embodiment of the present application, the scheduling request resource configuration may further include a scheduling request format. For example, the scheduling request format may indicate different types of PUCCHs carrying the scheduling request. Specifically, the PUCCH may be a long PUCCH or a short PUCCH. A difference between the long PUCCH and the short PUCCH may be a size of an occupied time domain resource and/or a size of an occupied frequency domain resource. For example, in LTE, frequency domain resources of the long PUCCH and the short PUCCH may be the same. However, in time domain, a TTI occupied by the long PUCCH may be 14 OFDM symbols, and a TTI occupied by the short PUCCH may be two OFDM symbols. Therefore, the scheduling request resource in the scheduling request resource configuration may indicate the uplink resource type together with the scheduling request format.

In this embodiment of the present application, the scheduling request resource configuration may further include first time information used to instruct the terminal to stop sending the scheduling request in a first time period. On one hand, the first time information may be determined based on the uplink resource type or the logical channel information. In an implementation, the base station instructs, based on a priority sequence of one or more uplink resource types, a priority sequence of one or more uplink resource types corresponding to one or more logical channels, or a priority sequence of one or more uplink resource types corresponding to one or more logical channel groups, the terminal to suspend sending the scheduling request in the first time period. On the other hand, duration of the first time may be limited by a first timer. For example, if the first timer does not expire, the terminal suspends sending the scheduling request to the base station. If the first timer expires, the terminal may send the scheduling request to the base station again. In addition, whether the terminal has sent the scheduling request to the base station may be a trigger condition of the first timer. Specifically, when the terminal sends a first scheduling request to the base station, the first timer may be enabled. The terminal determines, based on duration of the first timer, whether to send a second scheduling request to the base station. In this way, frequency of sending the scheduling request by the terminal may be limited, to reduce an unnecessary waste of an air interface resource, and improve effectiveness of uplink scheduling.

In this embodiment of the present application, the scheduling request resource configuration may further include second time information used to indicate a second time interval at which the terminal sends the scheduling request. The second time interval may prevent the terminal from frequently triggering an SR process due to an LCH or LCG having a low priority. The second time information may be determined based on the uplink resource type or the logical channel information. In an implementation, the base station instructs, based on the priority sequence of the uplink resource types, the priority sequence of the uplink resource types corresponding to the logical channels, or the priority sequence of the uplink resource types corresponding to the logical channel groups, the terminal to suspend sending the scheduling request in the second time interval. For example, the terminal may determine the time information based on the priority sequence of the logical channels. In other words, the second time interval may be determined based on activation or deactivation of a timer corresponding to the LCH or the LCG. For example, using two LCHs as an example, an LCH having a low priority is referred to as an LCH 1, and the other LCH is referred to as an LCH 2. The time interval may be limited by a second timer specific to the LCH 1. When the second timer does not expire and there is uplink data on the LCH 2, an SR process is triggered based on the LCH 2. When the second timer expires and there is no uplink data on the LCH 2, an SR process is triggered based on the LCH 1. For a manner of setting an LCG timer, refer to an application manner of the timer of the LCH.

In this embodiment of the present application, whether to trigger the terminal to send the SR to the base station may be determined depending on whether the terminal has a sufficient uplink resource to send a buffer status report (BSR) to the base station. The BSR is used to indicate the data volume of the uplink data to the base station, so that the base station further allocates an uplink resource to the terminal to carry the uplink data. For example, when the terminal has the uplink data to be sent to the base station, the terminal may send the BSR to the base station in the following two manners:

Manner 1: If the terminal has an uplink resource allocated by the base station in advance, the terminal sends the BSR to the base station based on the uplink resource, to notify the base station of the data volume of the uplink data. The base station may further allocate an uplink resource based on the obtained BSR to instruct the terminal to transmit the uplink data at which time, on which carrier, and in which modulation and coding scheme.

Manner 2: If the terminal does not have an uplink resource allocated by the base station in advance or the allocated uplink resource is insufficient to carry the BSR, the terminal needs to send the SR to the base station based on the SR resource sent by the base station, to request the base station to further allocate an uplink resource. A type of the uplink resource may be the same as or different from the uplink resource type indicated in the scheduling request resource. This may depend on a current status, a service capability, a quantity of served terminals, a service, or a type of the base station. This is not limited in embodiments of the present application.

Various formats of the BSR and a trigger condition of the BSR are described in detail below. A person skilled in the art may understand that, a format of the BSR sent by the terminal to the base station, a case in which the BSR is triggered, or information or content carried in the BSR may not depend on interaction between the terminal and the base station, for example, transfer of the SR, obtaining of the SR resource, or transmission of the uplink data. In other words, all related descriptions of the BSR may be protected by using the BSR as an independent technical solution. The foregoing descriptions of the BSR may alternatively be based on the foregoing SR process, an uplink data transmission process, or the like. This is not limited in embodiments of the present application.

In this embodiment of the present application, the terminal may send the BSR to the base station based on at least one of the following cases, where the BSR includes buffer information, and the buffer information includes the data volume of the uplink data carried on the logical channels or the logical channel groups; and the data volume may be, for example, a data buffer size:

a data volume of uplink data carried on any logical channel or logical channel group is not zero;

a data volume of uplink data carried on any logical channel or logical channel group is greater than a threshold;

a quantity of one or more logical channels or one or more logical channel groups that carry uplink data corresponding to the data volume is not greater than a preset value;

some or all uplink data corresponding to a data volume of the uplink data carried on any logical channel or logical channel group is transmitted by the terminal to the base station within a waiting time period; and some or all uplink data corresponding to a data volume of the uplink data carried on any logical channel or logical channel group is reported by the terminal to the base station for the first time.

In this embodiment of the present application, any logical channel or logical channel group may be understood as all the logical channels or all the logical channel groups of the uplink data corresponding to the data buffer size in the BSR.

In this embodiment of the present application, the terminal may communicate with the base station based on a wireless air interface that is classified into a user plane and a control plane based on a purpose. The user plane of the terminal may include a packet data convergence protocol (PDCP) layer, a radio link control (RLC) layer, and a media access control (MAC) layer. For example, the RLC layer and the MAC layer may be connected by using a logical channel. For another example, the MAC layer provides data transmission on the logical channel, and different logical channels are defined based on data of different service types. Main functions of the PDCP layer are compression and decompression of a header of user plane data, and security functions are, for example, encryption and decryption of the user plane and the control plane, integrity protection and verification of control plane data.

Figure 2:
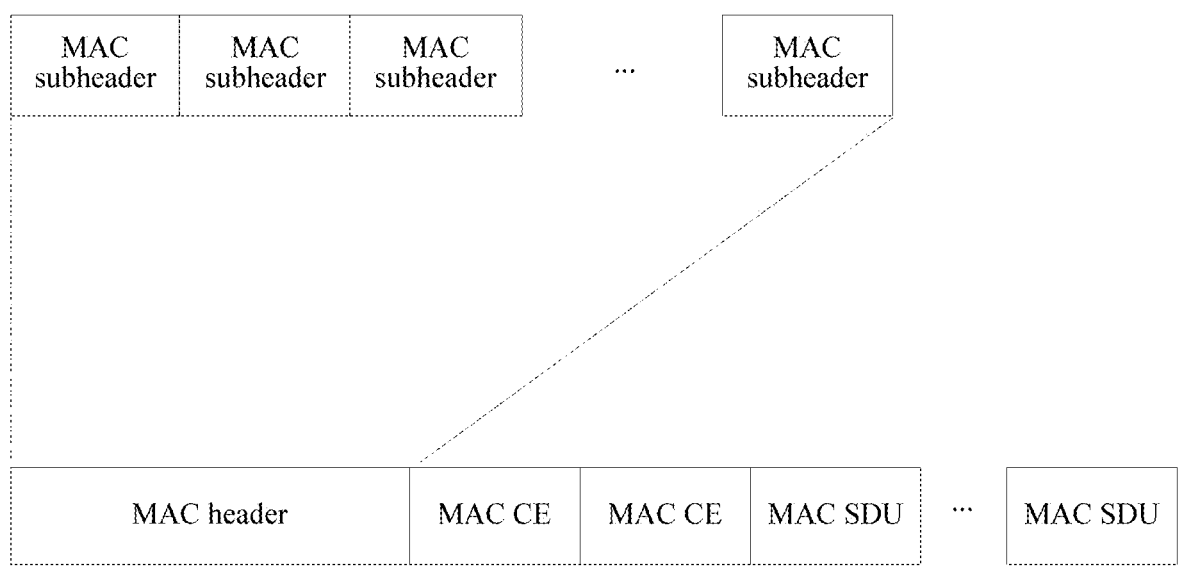
FIG. 2 is a schematic diagram of a media access control protocol data unit according to an embodiment of this application.

As shown in FIG. 2, the BSR may be carried in a media access control (MAC) protocol data unit (PDU) to be transmitted to the base station.

Specifically, the MAC PDU may include a MAC header and a MAC control element (CE). The MAC header may further include MAC sub-headers to indicate data volumes of different MAC CEs. For example, the MAC CE may carry the BSR, and each MAC sub-header may indicate a data volume of a BSR in a MAC CE corresponding to the MAC sub-header. Optionally, the MAC PDU may further include a MAC service data unit (SDU) used by the terminal to transmit the uplink data to the base station.

Figure 3:
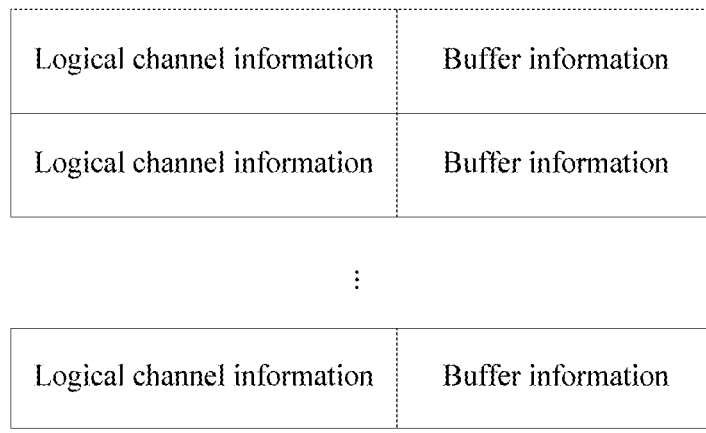
FIG. 3 is a schematic diagram of a format of a buffer status report according to an embodiment of this application.

As shown in FIG. 3, in this embodiment of the present application, the buffer status report (BSR) may include the logical channel information and the buffer information. The buffer information includes data volumes (which are briefly referred to as data buffer sizes below) of uplink data carried on one or more logical channels indicated by the logical channel information. The logical channel information may include the logical channel identifier or the logical channel group identifier. In this embodiment of the present application, the uplink data indicated by the data buffer size included in the buffer information may be to-be-transmitted data that has not been sent by the terminal to the base station or that has not been successfully sent by the terminal to the base station. The to-be-transmitted data does not include uplink data in the MAC SDU.

Specific descriptions are provided below based on a example presentation manner of the BSR or different BSR formats.

Based on a BSR format 1, the BSR may include bitmap information of the logical channels and the buffer information. The buffer information includes the data volumes of the uplink data carried on the logical channels indicated by the bitmap information.

Figure 4:
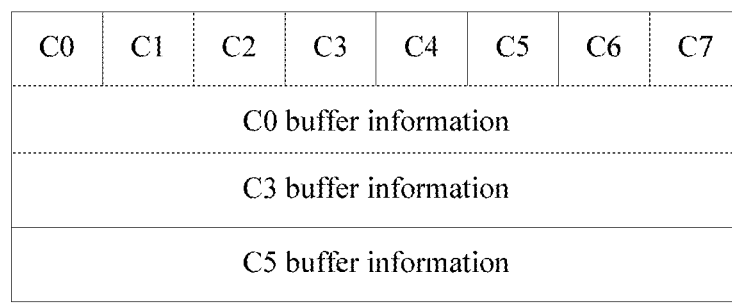
FIG. 4 is a schematic diagram of another format of a buffer status report according to an embodiment of this application.

For example, the bitmap information indicates whether the BSR includes the data volumes of the uplink data on the logical channels or logical channel groups. Alternatively, the bitmap information may indicate whether the corresponding logical channels or logical channel groups carry the uplink data. As shown in FIG. 4, using the logical channel group as an example, in the bitmap information, C0 to C7 each represents one bit, and each bit corresponds to eight logical channel groups, namely, an LCG 0 to an LCG 7. C0 to C7 may each indicate, by using 1, that the BSR includes a data volume of uplink data on a corresponding logical channel or indicate that there is uplink data on a corresponding logical channel group; and may each indicate, by using 0, that the BSR does not include a data volume of uplink data on a corresponding logical channel or indicate that there is no uplink data on a corresponding logical channel group. For example, the BSR includes data volumes of uplink data on the LCG 0, an LCG 3, and an LCG 5. Data volumes of uplink data on remaining LCGs are not carried in the BSR. In this case, bits corresponding to C0, C3, and C5 are indicated by 1, and remaining bits are indicated by 0. For each of the LCG 0, the LCG 3, and the LCG 5 having the uplink data, the buffer information indicates the data volume of the uplink data carried on each of the LCG 0, the LCG 3, and the LCG 5. In other words, the BSR may carry the data volumes of the uplink data on the logical channels, namely, the LCG 0, the LCG 3, and the LCG 5, that correspond to C0, C3, and C5. A person skilled in the art may understand that a quantity of bits in the bitmap information may be adjusted based on a quantity of LCGs carried in the BSR. Using eight LCGs as an example, whether each LCG carries uplink data may be indicated by using 8-bit bitmap information. In addition, the terminal may alternatively autonomously and flexibly configure a specific presentation manner of the bitmap information. Similarly, the bitmap information of the logical channel may directly indicate whether the LCH carries uplink data. This is not limited in embodiments of the present application. In this embodiment, a method for determining, based on the bitmap information of the logical channel, the data volumes, of the uplink data carried on the logical channels, that are included in the BSR is similar to a determining method performed based on bitmap information of the logical channel group. This is not limited in embodiments of the present application.

Figure 5:
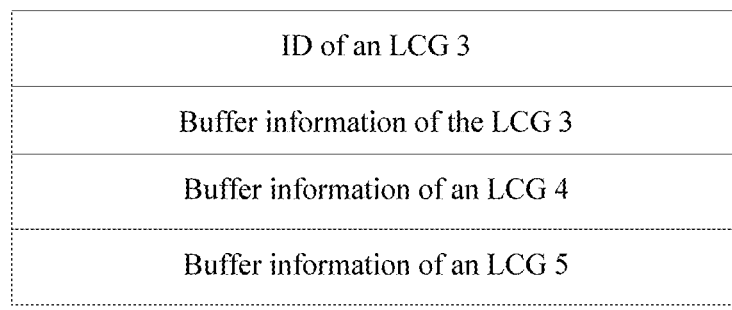
FIG. 5 is a schematic diagram of still another format of a buffer status report according to an embodiment of this application.

Based on a BSR format 2, the BSR may include the logical channel information, the buffer information, and a data volume of the BSR. The buffer information includes the data volumes of the uplink data carried on the logical channels or the logical channel groups that are indicated by the logical channel information. The logical channel information may be the first logical channel identifier or the first logical channel group identifier in the BSR. As shown in FIG. 5, using the logical channel group as an example, the base station may determine, based on data volumes of uplink data on LCGs, a quantity of LCGs included in the BSR, and then may further determine, with reference to the first LCG ID, the data volumes that are of the uplink data carried on the LCGs and that are included in the BSR. For example, the base station determines, based on a size that is of a BSR and that is indicated in a MAC sub-header, that the BSR includes three LCGs. The size of the BSR may be understood as an air interface resource occupied in a process of transmission to the base station. It is determined, with reference to the first LCG ID in the BSR, that the first LCG is an LCG 3, so that it may be determined in sequence that the BSR includes data volumes of uplink data on the LCG3, an LCG 4, and an LCG 5. In this embodiment, a method for determining, based on the identifier identifying the first logical channel, the data volumes, of the uplink data carried on the LCHs, that are included in the BSR is similar to the determining method performed based on the identifier identifying the first logical channel. This is not limited in embodiments of the present application.

The terminal may autonomously determine different formats of the foregoing BSRs, to improve flexibility of the terminal. For example, a data buffer size in a buffer may be a nonzero value. A quantity of buffers that is indicated by the BSR is reduced, to reduce air interface load, and improve a throughput. For another example, the terminal may indicate, by using the bitmap information of the logical channel or information about the first logical channel identifier and with reference to a current communication environment, specific information about the buffer of the base station.

Optionally, the data buffer size may be zero. Regardless of whether the data buffer size is zero, the base station may obtain, with reference to a size that is of each BSR and that is indicated by the MAC sub-header, a data volume actually carried in the BSR, a maximum data volume that can be carried, and the like, to perform configuration update in time based on a current status and a communication capability of the terminal.

Optionally, the data buffer size is greater than a threshold or a preset value. In this embodiment of the present application, a data volume that is of uplink data on any LCG or LCH and that is carried in the BSR may be greater than the threshold. Alternatively, a quantity of LCGs or LCHs may not be greater than the preset value. For example, when the quantity of LCGs or LCHs is greater than the preset value, a quantity of LCGs or LCHs that is reported by the terminal to the base station is equal to or less than the preset value. For another example, a data volume that is of uplink data on each LCH or each LCG and that may be reported by the terminal to the base station needs to be greater than the threshold. Further, after triggering the BSR and when obtaining the uplink resource allocated by the base station, the terminal may determine the quantity of LCGs or LCHs on which there currently is uplink data. When the quantity of LCGs or LCHs is greater than the preset value, the terminal selects, from the LCGs or the LCHs, an LCG or an LCH on which a data volume of carried uplink data is greater than the threshold, adds a data buffer size of the LCG or the LCH to the BSR, and sends the BSR to the base station. When the quantity of LCGs or LCHs is less than the preset value, the terminal may report data volumes of all uplink data on the LCGs or the LCHs to the base station. A person skilled in the art may understand that, the threshold or preset value may be determined based on a protocol, or independently configured by the base station.

Optionally, the uplink data corresponding to the data volume is transmitted by the terminal to the base station within a waiting time period. In this embodiment of the present application, the waiting time period may be determined based on duration of a discard timer of the terminal. Specifically, the MAC PDU may correspond to the discard timer. When uplink data is received on an LCG or an LCH, the discard timer may be enabled, to determine whether to discard the uplink data. For example, when a time segment between a buffer time of the uplink data on the LCG or the LCH and an expiration time of the discard timer is less than a third time, the terminal adds a data volume of the uplink data on the LCG or the LCH to the BSR or reports a data volume of the uplink data on the LCG or the LCH. When a time segment between a buffer time of the uplink data on the LCG or the LCH and an expiration time of the discard timer is greater than the third time, the terminal does not add a data volume of the uplink data on the LCG or the LCH to the BSR or does not report a data volume of the uplink data on the LCG or the LCH. When the discard timer expires, the terminal discards the uplink data. A person skilled in the art may understand that, the third time may be determined based on a protocol, or independently configured by the base station.

Optionally, the waiting time period may be less than the duration of the discard timer. Further, the waiting time period may be less than the duration of the discard timer and greater than the third time. An example in which the waiting time period is less than the duration of the discard timer is used below, but this embodiment of the present application is also applicable to a solution in which the waiting time period is less than the duration of the discard timer and greater than the third time. Specifically, after triggering the BSR, the terminal may determine, based on the duration of the discard timer, the waiting time period of the uplink data on the logical channels or the logical channel groups, and add the data volumes of the uplink data on the logical channels or the logical channel groups to the BSR or report the data volumes of the uplink data on the logical channels or the logical channel groups. For another example, when any logical channel or logical channel group includes uplink data whose waiting time period is less than the duration of the discard timer, the terminal may add a data volume of all uplink data on the logical channel or the logical channel group to the BSR or report a data volume of all uplink data on the logical channel or the logical channel group. The all uplink data may include the uplink data whose waiting time period is less than the duration of the discard timer and that is on the logical channel or the logical channel group, and uplink data whose waiting time period is not less than the duration of the discard timer and that is on the logical channel or the logical channel group. The terminal may alternatively selectively add a data volume of only the uplink data whose waiting time period is less than the duration of the discard timer and that is on the logical channel or the logical channel group to the BSR. Further, when the quantity of LCHs or LCGs having the uplink data is greater than the preset value, the terminal may transmit, to the base station, a data volume of uplink data whose waiting time period is less than the duration of the discard timer. When the quantity of LCHs or LCGs having the uplink data is less than or equal to the preset value, the terminal may transmit, to the base station, data volumes of all the uplink data on the LCHs or LCGs. A person skilled in the art may understand that, the preset value may be determined based on a protocol, or independently configured by the base station. In this embodiment, whether to add the data volume of the uplink data to the BSR is determined based on the waiting time period, to reduce a latency of sending the uplink data by the terminal, and satisfy quality of service (QoS) of a radio bearer.

Optionally, the data volume corresponds to uplink data having not been reported in the BSR. The uplink data may be uplink data not in a BSR sent by the terminal to the base station previously or last time and/or uplink data newly obtained after a BSR is sent previously or last time. For example, when there is the uplink data on an LCH or an LCG, the terminal may send a data volume of all uplink data on the LCH or the LCG to the base station, or may send a data volume of only the uplink data on the LCH or the LCG, or may not send a data volume of uplink data other than the uplink data on the LCH or the LCG. For another example, when there is the uplink data on an LCH or an LCG and a data volume of the uplink data exceeds the threshold, the terminal may send a data volume of all uplink data on the LCH or the LCG to the base station, or may send a data volume of only the uplink data on the LCH or the LCG, or may not send a data volume of uplink data other than the uplink data on the LCH or the LCG. For still another example, when there is the uplink data on an LCH or an LCG and a proportion of a data volume of the uplink data in a data volume of all uplink data on the LCH or the LCG exceeds the threshold, the terminal may send the data volume of all the uplink data on the LCH or the LCG to the base station, or may send the data volume of only the uplink data on the LCH or the LCG, or may not send a data volume of uplink data other than the uplink data on the LCH or the LCG.

In this embodiment of the present application, the uplink data may be at least one of the following:

that the terminal has received an acknowledgement sent by the base station for receiving the uplink data;

uplink data transmitted by the terminal to the base station for the first time; and uplink data newly obtained by the terminal after previous BSR transmission.

Figure 6:
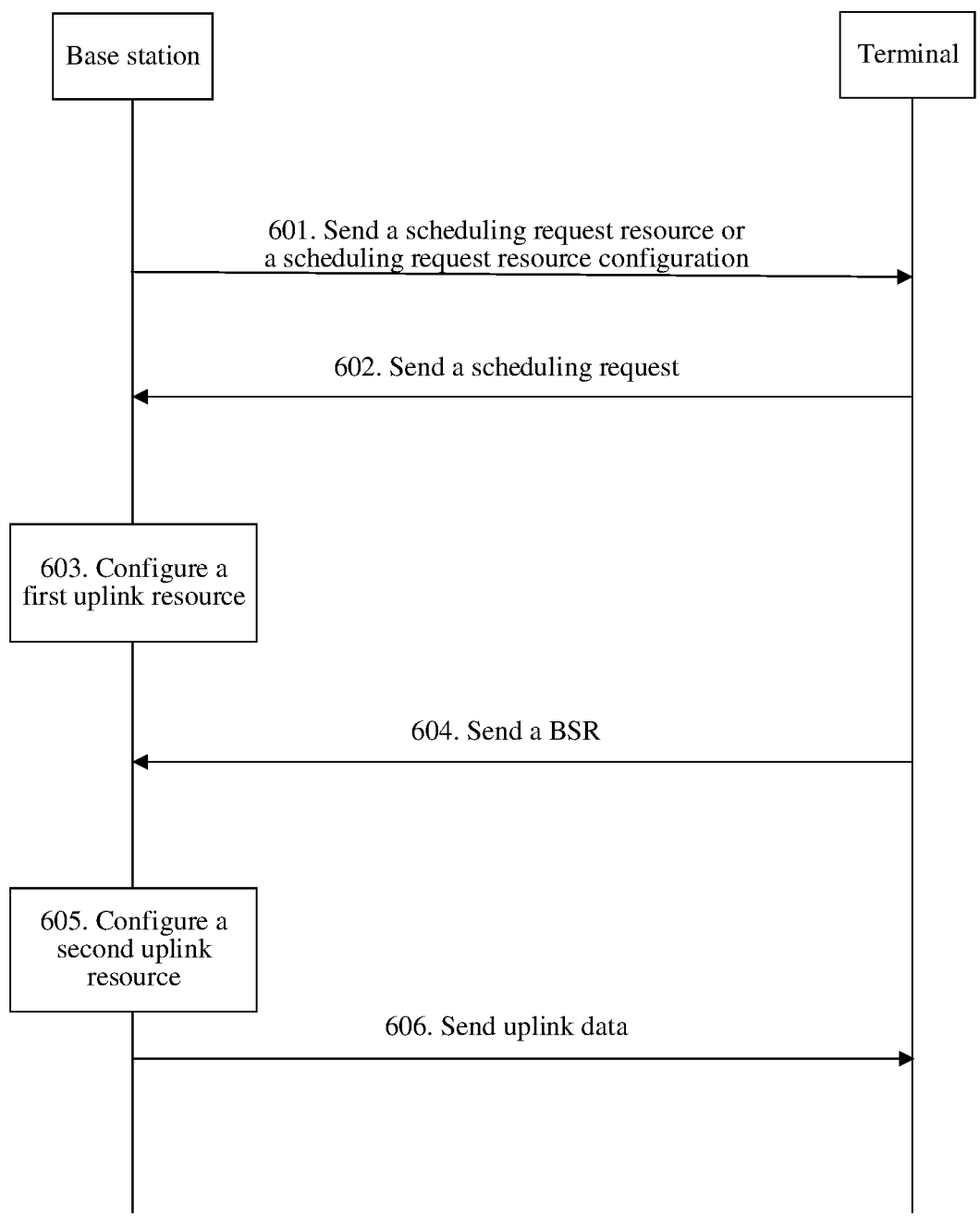
FIG. 6 is a schematic flowchart of a communication method according to an embodiment of this application.

The technical solutions provided in the embodiments of the present application are described below with reference to FIG. 6. Meanings or functions of the following terms or nouns may be understood with reference to the foregoing descriptions, and specific details or implementations of the following steps or actions may also be understood with reference to the foregoing descriptions.

In part 601, a base station sends a scheduling request resource configuration to a terminal, where the scheduling request resource configuration indicates an uplink resource type or logical channel information.

Optionally, the scheduling request resource configuration or a scheduling request resource may indicate at least one uplink resource type, at least one LCH, or at least one LCG.

In part 602, the terminal sends a scheduling request to the base station by using the scheduling request resource configuration.

Optionally, the terminal may determine a target uplink resource type based on uplink data. Subsequently, the terminal may autonomously select, based on the target uplink resource type and from at least one scheduling request resource configured by the base station, a target scheduling request resource indicating the target uplink resource type.

Optionally, the base station may configure the at least one scheduling request resource based on the logical channel information. The terminal determines the target scheduling request resource based on the logical channel information in the scheduling request resource configuration, and the target scheduling request resource indicates the target uplink resource type. Subsequently, the terminal sends the scheduling request to the base station on the target scheduling request resource.

The solution in this embodiment may further include part 603. In part 603, the base station configures a first uplink resource based on the scheduling request.

Optionally, the uplink resource configured by the base station corresponds to the target uplink resource type indicated by the scheduling request resource. The base station may alternatively configure, based on a current communication status, an uplink resource corresponding to another uplink resource type.

The solution in this embodiment may further include part 604. In part 604, the terminal sends a BSR to the base station based on the first uplink resource.

Optionally, the first uplink resource may be an uplink grant (UL grant) used to indicate time-frequency domain information or a modulation and coding scheme for sending the BSR by the terminal to the base station.

Optionally, the terminal sends the BSR to the base station based on at least one of the following cases, where the BSR includes buffer information, and the buffer information includes data volume of uplink data carried on one or more logical channels or one or more logical channel groups, and the data volume may be, for example, a data buffer size under the following situations:

a data volume of uplink data carried on any logical channel or logical channel group is not zero;

a data volume of uplink data carried on any logical channel or logical channel group is greater than a threshold;

a quantity of one or more logical channels or one or more logical channel groups that carry uplink data corresponding to the data volume is not greater than a preset value;

some or all uplink data corresponding to a data volume of the uplink data carried on any logical channel or logical channel group is transmitted by the terminal to the base station in a waiting time period; and/or some or all uplink data corresponding to a data volume of the uplink data carried on any logical channel or logical channel group is reported by the terminal to the base station for the first time.

Optionally, the BSR includes the logical channel information and a data volume of uplink data carried on a logical channel indicated by the logical channel information.

Optionally, the BSR includes bitmap information of the logical channel, the bitmap information indicates whether the BSR includes the data volumes of the uplink data on the logical channels or the logical channel groups and the data volumes of the uplink data carried on the logical channels or the logical channel groups.

Optionally, the BSR includes the logical channel information, a data volume of uplink data carried on a logical channel indicated by the logical channel information, and a data volume of the BSR.

The solution in this embodiment may further include part 605. In part 605, the base station configures a second uplink resource based on the obtained BSR.

Optionally, the uplink resource configured by the base station corresponds to the target uplink resource type indicated by the scheduling request resource. The base station may alternatively configure, based on the current communication status, an uplink resource corresponding to another uplink resource type.

Optionally, after receiving the BSR, the base station allocates the uplink resource to the terminal again, for example, sends the uplink resource to the terminal by using an uplink grant (UL grant). The UL grant is used to indicate time-frequency domain information or a modulation and coding scheme for sending the uplink data by the terminal to the base station.

The solution in this embodiment may further include part 606. In part 606, the terminal sends the uplink data to the base station based on the second uplink resource.

Optionally, the data volume of the uplink data is carried in the BSR sent by the terminal to the base station.

Optionally, if having not received, after the terminal sends the SR to the base station, the UL grant sent by the base station, the terminal may continue to send the SR on a next SR resource. If the terminal still has not received, after a quantity of times of sending the SR by the terminal reaches a specific quantity of times (for example, six times, where the specific quantity of times is not limited in this embodiment of the present application), the UL grant delivered by the base station, the terminal may initiate a random access (RA) process on a physical random access channel (PRACH) to send the SR to the base station.

In the foregoing embodiments provided in the present application, solutions of the communication method that are provided in the embodiments of the present application are separately described from the perspectives of network elements and interaction between the network elements. It may be understood that to implement the foregoing functions, the network elements, for example, UE, the base station, and the control node include a corresponding hardware structure and/or a corresponding software module for performing the functions. A person skilled in the art should be easily aware that, examples of units and algorithm steps described with reference to the embodiments disclosed in this specification may be implemented by hardware or a combination of hardware and computer software in the present application. Whether a function is implemented by hardware or by computer software driving hardware depends on a particular application and a design constraint of the technical solution. A person skilled in the art may use different methods to implement the described functions for each particular application, but it should not be considered that the implementation goes beyond the scope of the present application.

Figure 7:
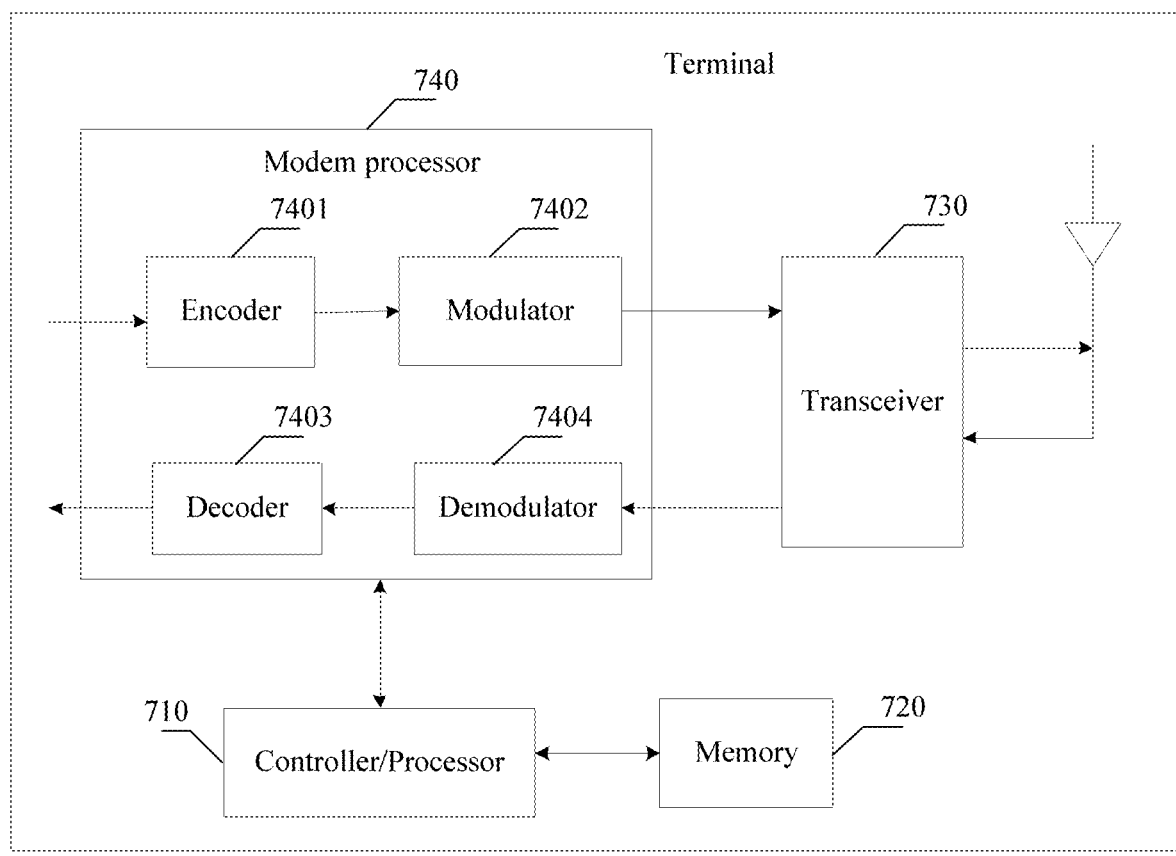
FIG. 7 is a schematic structural diagram of a terminal according to an embodiment of this application.

FIG. 7 is a schematic structural diagram of a terminal 700 according to an embodiment of this application. Meanings or functions of the following terms or nouns may be understood with reference to the foregoing descriptions, and specific details or implementations of the following steps or actions may also be understood with reference to the foregoing descriptions. As shown in FIG. 7, the terminal 700 may include a controller/processor 710 and a transceiver 730. The transceiver 730 may be connected to an antenna.

The transceiver 730 may be configured to support the terminal 700 in receiving information from and sending information to a base station in the foregoing embodiment. The transceiver 730 may be configured to perform processing performed by a terminal in the communication method described in the foregoing embodiment, for example, receive a scheduling request resource configuration sent by the base station, and send a scheduling request to the base station. Optionally, the transceiver 730 may be configured to send a BSR to the base station. Optionally, the transceiver 730 may be configured to send uplink data to the base station. The controller/processor 710 may be configured to control or manage actions of the terminal, for example, select a target scheduling request resource based on a priority sequence of one or more logical channels or a priority sequence of uplink resource types corresponding to the logical channels.

Optionally, on an uplink, the transceiver 730 adjusts (for example, performs analog conversion on, filters, amplifies, and up-converts) an output sample, and generates an uplink signal. The uplink signal is transmitted to the base station in the foregoing embodiment by using the antenna. Optionally, on a downlink, the antenna receives a downlink signal transmitted by the base station in the foregoing embodiments. The transceiver 730 adjusts (for example, filters, amplifies, down-converts, and digitizes) the signal received from the antenna and provides an input sample.

Optionally, the terminal 700 may further include a modem processor 740. In the modem processor 740, an encoder 7401 receives service data and a signaling message that are to be sent on the uplink, and processes (for example, formats, encodes, and interleaves) the service data and the signaling message. A modulator 7402 further processes (for example, performs symbol mapping on and modulates) encoded service data and an encoded signaling message, and provides the output sample. A demodulator 7404 processes (for example, demodulates) the input sample and provides a symbol estimation. A decoder 7403 processes (for example, de-interleaves and decodes) the symbol estimation and provides decoded data and a decoded signaling message that are to be sent to the terminal. The encoder 7401, the modulator 7402, the demodulator 7404, and the decoder 7403 may be implemented by the combined processor 740.

The terminal 700 may further include a memory 720 that may be configured to store program code and data of the terminal.

Figure 8:
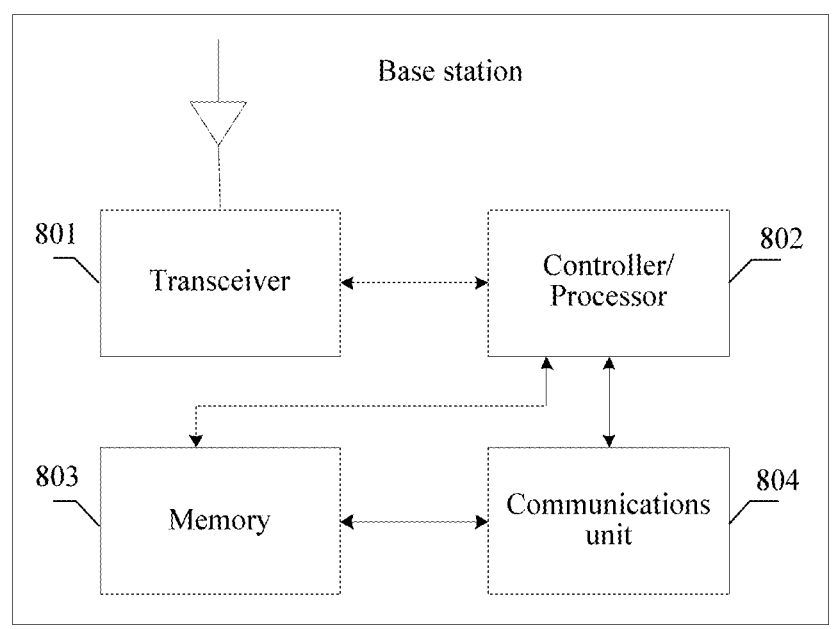
FIG. 8 is a schematic structural diagram of a base station according to an embodiment of this application.

FIG. 8 is a schematic structural diagram of a base station 800 according to an embodiment of this application. FIG. 8 is a possible schematic structural diagram of the base station 800 in the foregoing embodiment. Meanings or functions of the following terms or nouns may be understood with reference to the foregoing descriptions, and specific details or implementations of the following steps or actions may also be understood with reference to the foregoing descriptions.

The base station 800 includes a transceiver 801 and a controller/processor 802. The transceiver 801 may be configured to support the base station 800 in receiving information from and sending information to a terminal in the foregoing embodiments. The controller/processor 802 may be configured to perform various functions for communication with the terminal or another network device. On an uplink, an uplink signal from the terminal is received by using an antenna, modulated by the transceiver 801, and further processed by the controller/processor 802, to restore service data and signaling information that are sent by the terminal. On a downlink, service data and a signaling message are processed by the controller/processor 802 and are modulated by the transceiver 801 to generate a downlink signal, and the downlink signal is transmitted to the UE by using the antenna.

The transceiver 801 is configured to perform the communication method described in the foregoing embodiments, for example, sending a scheduling request resource configuration to the terminal. Optionally, the transceiver 801 receives a scheduling request sent by the terminal. Optionally, the transceiver 801 receives a BSR sent by the terminal. The controller/processor 802 is further configured to perform the communication methods described in the foregoing embodiments, for example, configuring a scheduling request resource based on one or more uplink resource types or logical channel information. Optionally, the controller/processor 802 configures a scheduling request resource based on a priority sequence of one or more logical channels corresponding to the logical channel information or based on a priority sequence of the one or more uplink resource types. The one or more logical channels corresponding to the logical channel information have the one or more uplink resource types. Optionally, the controller/processor 802 may alternatively configure a first uplink resource used by the terminal to send the BSR, and may further configure a second uplink resource used by the terminal to send uplink data. The controller/processor 802 may be further configured to perform a processing process of the base station in FIG. 6 and/or another process used for the technology described in this application. The base station 800 may further include a memory 803 that may be configured to store program code and data of the base station 800. The base station 800 may further include a communications unit 804, configured to support the base station 800 in communicating with another network entity. For example, the communications unit 804 is configured to support the base station 800 in communicating with another communications network entity shown in FIG. 1, for example, the control node 13.

It may be understood that, FIG. 7 or FIG. 8 shows only a simplified implementation of the terminal 700 or the base station 800. In an example actual application, the terminal 700 or the base station 800 may include any quantity of transceivers, processors, and memories. Any quantity of communications units may provide the foregoing functions separately or through combination.

The controller/processor configured to perform functions of the base station or the terminal in the present application may be a central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The controller/processor can implement or execute various examples of logical blocks, modules, and circuits that are described with reference to the content disclosed in the present application. The processor may be a combination for implementing a computing function, for example, a combination of one or more microprocessors or a combination of the DSP and a microprocessor.

The methods or algorithm steps described with reference to the content disclosed in the present application may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other forms well-known in the art. A storage medium used as an example is coupled to the processor, so that the processor can read information from the storage medium, and can write information into the storage medium. The storage medium may be a component of the processor. The processor and the storage medium may be located in the ASIC. In addition, the ASIC may be located in the terminal or the base station. The processor and the storage medium may exist in the terminal or the base station as discrete assemblies.

A person skilled in the art should be aware that in the foregoing one or more examples, functions described in the present application may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A communication method, comprising:
receiving, by a terminal, a scheduling request resource configuration sent by a base station, wherein the scheduling request resource configuration indicates logical channel information; and
sending, by the terminal, a scheduling request to the base station via a target scheduling request resource based on the scheduling request resource configuration and uplink data, wherein the target scheduling request resource indicates a target uplink resource type, and the scheduling request resource configuration comprises the target scheduling request resource, wherein
the logical channel information comprises target logical channel information corresponding to the target uplink resource type,
wherein sending the scheduling request to the base station via the target scheduling request resource comprises:
determining, by the terminal, the target uplink resource type based on the logical channel information indicated by the scheduling request resource configuration;
determining, by the terminal, the target scheduling request resource based on the determined target uplink resource type; and
sending, by the terminal, the scheduling request to the base station via the determined target scheduling request resource.

2. The method according to claim 1, wherein the sending the scheduling request to the base station further comprises:
selecting, by the terminal, the target scheduling request resource based on a priority sequence of one or more logical channels having the uplink data; and
sending, by the terminal, the scheduling request to the base station on the selected target scheduling request resource.

3. The method according to claim 1, wherein
the scheduling request resource configuration further comprises a mapping relationship between the logical channel information and a scheduling request resource.

4. The method according to claim 1, wherein
the scheduling request resource configuration further comprises first time information instructing the terminal to stop sending the scheduling request within a first time period, wherein the first time information is determined based on the logical channel information.

5. The method according to claim 1, further comprising:
sending, by the terminal, a buffer status report (BSR) to the base station, wherein the BSR comprises buffer information comprising a data volume of uplink data carried on one or more logical channels or one or more logical channel groups, and the BSR is sent to the base station when:
a data volume of uplink data carried on any of the one or more logical channels or the one or more logical channel groups is not zero;
a data volume of uplink data carried on any of the one or more logical channels or the one or more logical channel groups is greater than a threshold;
a quantity of one or more logical channels or one or more logical channel groups that carry uplink data corresponding to the data volume is not greater than a preset value;
some or all uplink data corresponding to a data volume of uplink data carried on any of the one or more logical channels or the one or more logical channel groups is transmitted by the terminal to the base station during a waiting time period; and/or
some or all uplink data corresponding to a data volume of uplink data carried on any of the one or more logical channels or the one or more logical channel groups is reported by the terminal to the base station for a first time.

6. The method according to claim 1, wherein the uplink resource type includes at least one of: a subcarrier spacing, a cyclic prefix length, a transmission time interval (TTI) length, or uplink transmission power.

7. A communication method, comprising:
sending, by a base station, a scheduling request resource configuration to a terminal, wherein the scheduling request resource configuration indicates logical channel information; and
receiving, by the base station, a scheduling request sent by the terminal via a target scheduling request resource, wherein the target scheduling request resource indicates a target uplink resource type, and the scheduling request resource configuration comprises the target scheduling request resource, wherein
the logical channel information comprises target logical channel information corresponding to the target uplink resource type, and
wherein the target uplink resource type is determined by the terminal based on the logical channel information indicated by the scheduling request resource configuration, and the target scheduling request resource is determined by the terminal based on the determined target uplink resource type.

8. The method according to claim 7, further comprising:
configuring, by the base station, the target scheduling request resource based on the logical channel information.

9. The method according to claim 8, wherein the configuring the target scheduling request resource comprises:
configuring, by the base station, the target scheduling request resource based on a priority sequence of one or more logical channels corresponding to the logical channel information.

10. The method according to claim 7, wherein
the scheduling request resource configuration further comprises:
a mapping relationship between the logical channel information and a scheduling request resource.

11. The method according to claim 7, further comprising:
determining, by the base station, a first time period based on the logical channel information, wherein
the scheduling request resource configuration further comprises first time information instructing the terminal to stop sending the scheduling request within the first time period.

12. A terminal, comprising a transceiver configured to:
receive a scheduling request resource configuration sent by a base station, wherein the scheduling request resource configuration indicates logical channel information, and
send a scheduling request to the base station via a target scheduling request resource based on the scheduling request resource configuration and uplink data, wherein the target scheduling request resource indicates a target uplink resource type, and the scheduling request resource configuration comprises the target scheduling request resource, wherein the logical channel information comprises target logical channel information corresponding to the target uplink resource type, wherein the terminal further comprises at least one processor configured to:

determine the target uplink resource uplink resource type based on the logical channel information indicated by the scheduling request resource configuration;

determine the target scheduling request resource based on the determined target uplink resource type; and send the scheduling request to the base station via the determined target scheduling request resource.

13. The terminal according to claim 12, wherein the at least one processor is further configured to select the target scheduling request resource based on a priority sequence of one or more logical channels having the uplink data, and send the scheduling request to the base station on the target scheduling request resource.

14. The terminal according to claim 12, wherein the scheduling request resource configuration further comprises a mapping relationship between the logical channel information and a scheduling request resource.

15. The terminal according to claim 12, wherein the transceiver is further configured to send the scheduling request to the base station; and the scheduling request resource configuration further comprises first time information instructing the transceiver to stop sending the scheduling request within a first time period, wherein the first time information is determined based on the logical channel information.

16. The terminal according to claim 12, wherein the transceiver is further configured to send a buffer status report (BSR) to the base station, wherein the BSR comprises buffer information comprising a data volume of uplink data carried on one or more logical channels or one or more logical channel groups, and the BSR is sent to the base station when:

a data volume of uplink data carried on any of the one or more logical channels or the one or more logical channel groups is not zero;

a data volume of uplink data carried on any of the one or more logical channels or the one or more logical channel groups is greater than a threshold;

a quantity of one or more logical channels or one or more logical channel groups that carry uplink data corresponding to the data volume is not greater than a preset value;

some or all uplink data corresponding to a data volume of uplink data carried on any of the one or more logical channels or the one or more logical channel groups is transmitted by the terminal to the base station during a waiting time period; and/or some or all uplink data corresponding to a data volume of uplink data carried on any of the one or more logical channels or the one or more logical channel groups is reported by the terminal to the base station for a first time.

17. A base station, comprising a transceiver configured to:

send a scheduling request resource configuration to a terminal, wherein the scheduling request resource configuration indicates logical channel information, and receive a scheduling request sent by the terminal via a target scheduling request resource, wherein the target scheduling request resource indicates a target uplink resource type, and the scheduling request resource configuration includes the target scheduling request resource, wherein the logical channel information comprises target logical channel information corresponding to the target uplink resource type, wherein the target uplink resource type is determined by the terminal based on the logical channel information indicated by the scheduling request resource configuration, and the target scheduling request resource is determined by the terminal based on the determined target uplink resource type.

18. The base station according to claim 17, further comprising:

a processor configured to configure the target scheduling request resource based on the logical channel information.

19. The base station according to claim 18, wherein the processor is configured to configure the target scheduling request resource based on a priority sequence of one or more logical channels corresponding to the logical channel information.

20. The base station according to claim 17, wherein the scheduling request resource configuration further comprises a mapping relationship between the logical channel information and a scheduling request resource.

21. The base station according to claim 18, wherein the processor is further configured to determine a first time period based on the logical channel information, wherein the scheduling request resource configuration further comprises first time information instructing the transceiver to stop sending the scheduling request within the first time period.

\* \* \* \* \*